US008725498B1

(12) United States Patent
Sung et al.

(10) Patent No.: US 8,725,498 B1
(45) Date of Patent: May 13, 2014

(54) MOBILE SPEECH RECOGNITION WITH EXPLICIT TONE FEATURES

(75) Inventors: Yun-hsuan Sung, Mountain View, CA (US); Meihong Wang, Los Angeles, CA (US); Xin Lei, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 70 days.

(21) Appl. No.: 13/556,856

(22) Filed: Jul. 24, 2012

Related U.S. Application Data

(60) Provisional application No. 61/661,890, filed on Jun. 20, 2012.

(51) Int. Cl.
*G10L 15/02* (2006.01)

(52) U.S. Cl.
CPC ..................... *G10L 15/02* (2013.01)
USPC ............ 704/207; 704/208; 704/214; 704/251

(58) Field of Classification Search
USPC ................... 704/207, 208, 214, 251
See application file for complete search history.

(56) References Cited

U.S. PATENT DOCUMENTS

| | | | | |
|---|---|---|---|---|
| 5,459,815 A * | 10/1995 | Aikawa et al. | ................. | 704/254 |
| 5,602,960 A * | 2/1997 | Hon et al. | ...................... | 704/207 |
| 5,907,826 A * | 5/1999 | Takagi | ........................... | 704/251 |
| 6,122,607 A * | 9/2000 | Ekudden et al. | .............. | 704/212 |
| 6,199,036 B1 * | 3/2001 | Ahmadi | ......................... | 704/207 |
| 6,510,410 B1 * | 1/2003 | Chen et al. | .................... | 704/251 |
| 6,553,342 B1 * | 4/2003 | Zhang et al. | ................... | 704/255 |
| 6,721,699 B2 * | 4/2004 | Xu et al. | ........................ | 704/207 |
| 6,738,457 B1 * | 5/2004 | Pickering et al. | .......... | 379/88.16 |
| 6,751,337 B2 * | 6/2004 | Tewfik et al. | ................ | 382/100 |
| 6,829,578 B1 * | 12/2004 | Huang et al. | .................. | 704/211 |
| 7,085,716 B1 * | 8/2006 | Even et al. | ..................... | 704/235 |
| 7,454,034 B2 * | 11/2008 | Tewfik et al. | ................ | 382/100 |
| 7,970,606 B2 * | 6/2011 | Hardwick | ..................... | 704/221 |
| 2003/0083875 A1 * | 5/2003 | Brown et al. | ................. | 704/249 |
| 2003/0095685 A1 * | 5/2003 | Tewfik et al. | ................ | 382/100 |
| 2004/0093206 A1 * | 5/2004 | Hardwick | ..................... | 704/221 |
| 2005/0025334 A1 * | 2/2005 | Tewfik et al. | ................ | 382/100 |
| 2008/0031475 A1 * | 2/2008 | Goldstein | ..................... | 381/151 |
| 2008/0120108 A1 * | 5/2008 | Soong et al. | .................. | 704/254 |
| 2008/0263359 A1 * | 10/2008 | Radzishevsky | ............... | 713/176 |

OTHER PUBLICATIONS

Chen et al. "New Methods in Continuous Mandarin Speech Recognition", EuroSpeech, 1997.*
Huang et al. "Pitch Tracking and Tone Features for Mandarin Speech Recognition", ICASSP 2000.*
Lei et al. "Improved Tone Modeling for Mandarin Broadcast News Speech Recognition", Proc. Int. Conf. on Spoken Language Processing, Pittsburgh, Pennsylvania, USA, Sep. 2006.*
Atal, B.S. and Hanauer, Suzanne L., "Speech Analysis and Synthesis by Linear Prediction of the Speech Wave," The Journal of the Acoustical Society of America, Apr. 1971, pp. 637-655.

\* cited by examiner

*Primary Examiner* — Jialong He
(74) *Attorney, Agent, or Firm* — Fish & Richardson P.C.

(57) ABSTRACT

A computer-implemented method for digital speech processing, including (1) receiving, at a server computer, digital speech data from a computing device, the digital speech data comprising data points sampled at respective time points; (2) computing, by the server computer, a tonal feature of the digital speech data, the tonal feature comprising information encoding fundamental frequencies at the respective time points; (3) computing, by the server computer, a logarithm of the tonal feature at the respective time points; and (4) processing, by the server computer, the logarithm of the tonal feature based on a characterization of the digital speech data at the respective time points.

21 Claims, 6 Drawing Sheets

MOBILE SPEECH RECOGNITION WITH EXPLICIT TONE FEATURES

CROSS-REFERENCE TO RELATED APPLICATIONS

This application claims the benefit of U.S. Provisional Application No. 61/661,890, filed Jun. 20, 2012, the contents of all of which are incorporated herein by reference.

FIELD

This specification generally relates to speech signal processing.

BACKGROUND

Unlike speech in the English language, speech in the Mandarin Chinese language employs tonal variations to provide lexical disambiguation for the same phonetic pronunciation. There are generally four tones in Mandarin Chinese speech: a high level tone, a rising tone, a dipping tone, and a falling tone. Each tone is characterized by a corresponding tonal contour.

SUMMARY

In general, one aspect of the subject matter described in this specification may be embodied in methods that include the actions of processing segments of digital speech data differently, depending on whether a given segment of digital speech data is characterized as voiced data or unvoiced data. In one aspect, a server computer computes the tonal feature of the digital speech data. If the a server computer determines that the given segment of the digital speech data encodes voiced data, the server computer will first compute a logarithm of the tonal feature and will then compute the first order differential of the computed tonal feature. If, however, the server computer determines that the given segment of the digital speech data encodes unvoiced data, the server computer will generate random or pseudo-random noise instead of computing the first order derivative of a logarithm. When consecutive segments of digital speech data have been processed in the above manner, the server computer can smooth or interpolate the processed segments to generate an output. The output may feed downstream processes of speech recognition or speaker identification.

As used in this specification, voiced data represents voiced speech or sound for which the vocal cords vibrate during the pronunciation and the vibration can be felt in the throat. Unvoiced data, by contrast, represents unvoiced speech or sound for which the vocal cords do not vibrate during the pronunciation and no vibrations can be felt at the throat.

In general, another aspect of the subject matter described in this specification may be embodied in methods that include the actions of receiving, by a server computer, digital speech data from a computing device, the digital speech data including data points sampled at respective time points; computing, by the server computer, a tonal feature of the digital speech data, the tonal feature including information encoding the fundamental frequencies of the digital speech data at the respective time points; computing, by the server computer, a logarithm of the tonal feature at the respective time points; and processing, by the server computer, the logarithm of the tonal feature based on a characterization of the digital speech data at the respective time points.

Processing the logarithm may include: computing, for the respective time points at which the digital speech data is characterized as voiced data, a first order derivative of the logarithm of the tonal feature; providing, for the respective time points at which the digital speech data is characterized as voiced data, a perturbation; and generating an output that includes the first order derivative and the perturbation.

The methods may further include: processing the output by a smoothing operation, or an interpolation operation. The interpolation operation may include, for example. a bilinear interpolation, a cubic interpolation, or a spline interpolation.

Based on the processed output, the methods may proceed further by performing feature extraction of the digital speech data. The feature extraction can include a tone detection, a pitch detection, a harmonic detection, a subharmonic detection, or combinations thereof. The feature extraction results may be incorporated into a database of speech data. The database may be consulted when the server computer processes later acquired speech data. The later acquired speech data may be from speakers different from the speaker of the received digital speech data.

The perturbation used as a substitute for unvoiced data may be characterized by a Gaussian random noise with a characteristic standard deviation on the order of about 0.1. The unvoiced data may correspond to a region in the digital speech data where the tonal feature is computed to be substantially zero. The unvoiced data may correspond to consonant. In contrast, the voiced data correspond to vowels.

Other embodiments of these aspects include corresponding systems, apparatus, and computer programs, configured to perform the actions of the methods, encoded on computer storage devices.

In general, another aspect of the subject matter described in this specification may be embodied in a computer-readable medium comprising software instructions that when executed by one or more computers, cause the one or more computers to perform operations that include the actions of receiving digital speech data from a computing device, the digital speech data including data points sampled at respective time points; computing a tonal feature of the digital speech data, the tonal feature including information encoding the fundamental frequencies of the digital speech data at the respective time points; computing a logarithm of the tonal feature at the respective time points; and processing the logarithm of the tonal feature based on a characterization of the digital speech data at the respective time points.

Processing the logarithm may include the actions of: computing, for the respective time points at which the digital speech data is characterized as voiced data, a first order derivative of the logarithm of the tonal feature; providing, for the respective time points at which the digital speech data is characterized as voiced data, a perturbation; and generating an output that includes the first order derivative and the perturbation.

The operations may further include the actions of: processing the output by a smoothing operation, or an interpolation operation. The interpolation operation may include, for example. a bilinear interpolation, a cubic interpolation, or a spline interpolation.

Based on the processed output, the one or more computers may proceed further by performing feature extraction of the digital speech data. The feature extraction can include a tone detection, a pitch detection, a harmonic detection, a subharmonic detection, or combinations thereof. The feature extraction results may be incorporated into a database of speech data. The database may be consulted when the one or more processors processes later acquired speech data. The later acquired speech data may be from speakers different from the speaker of the received digital speech data.

The perturbation used as a substitute for unvoiced data may be characterized by a Gaussian random noise with a characteristic standard deviation on the order of about 0.1. The unvoiced data may correspond to a region in the digital speech data where the tonal feature is computed to be substantially zero. The unvoiced data may correspond to consonant. In contrast, the voiced data correspond to vowels.

In general, yet another aspect of the subject matter described in this specification may be embodied in system including one or more processors and a computer-readable storage device. The computer-readable storage device includes software instructions that when executed by one or more processors, cause the one or more processors to perform operations that include the actions of receiving digital speech data from a computing device, the digital speech data including data points sampled at respective time points; computing a tonal feature of the digital speech data, the tonal feature including information encoding the fundamental frequencies of the digital speech data at the respective time points; computing a logarithm of the tonal feature at the respective time points; and processing the logarithm of the tonal feature based on a characterization of the digital speech data at the respective time points.

Processing the logarithm may include the actions of: computing, for the respective time points at which the digital speech data is characterized as voiced data, a first order derivative of the logarithm of the tonal feature; providing, for the respective time points at which the digital speech data is characterized as voiced data, a perturbation; and generating an output that includes the first order derivative and the perturbation.

The operations may further include the actions of: processing the output by a smoothing operation, or an interpolation operation. The interpolation operation may include, for example. a bilinear interpolation, a cubic interpolation, or a spline interpolation.

Based on the processed output, the one or more processors may proceed further by performing feature extraction of the digital speech data. The feature extraction can include a tone detection, a pitch detection, a harmonic detection, a subharmonic detection, or combinations thereof. The feature extraction results may be incorporated into a database of speech data. The database may be consulted when the one or more processors processes later acquired speech data. The later acquired speech data may be from speakers different from the speaker of the received digital speech data.

The perturbation used as a substitute for unvoiced data may be characterized by a Gaussian random noise with a characteristic standard deviation on the order of about 0.1. The unvoiced data may correspond to a region in the digital speech data where the tonal feature is computed to be substantially zero. The unvoiced data may correspond to consonant. In contrast, the voiced data correspond to vowels.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
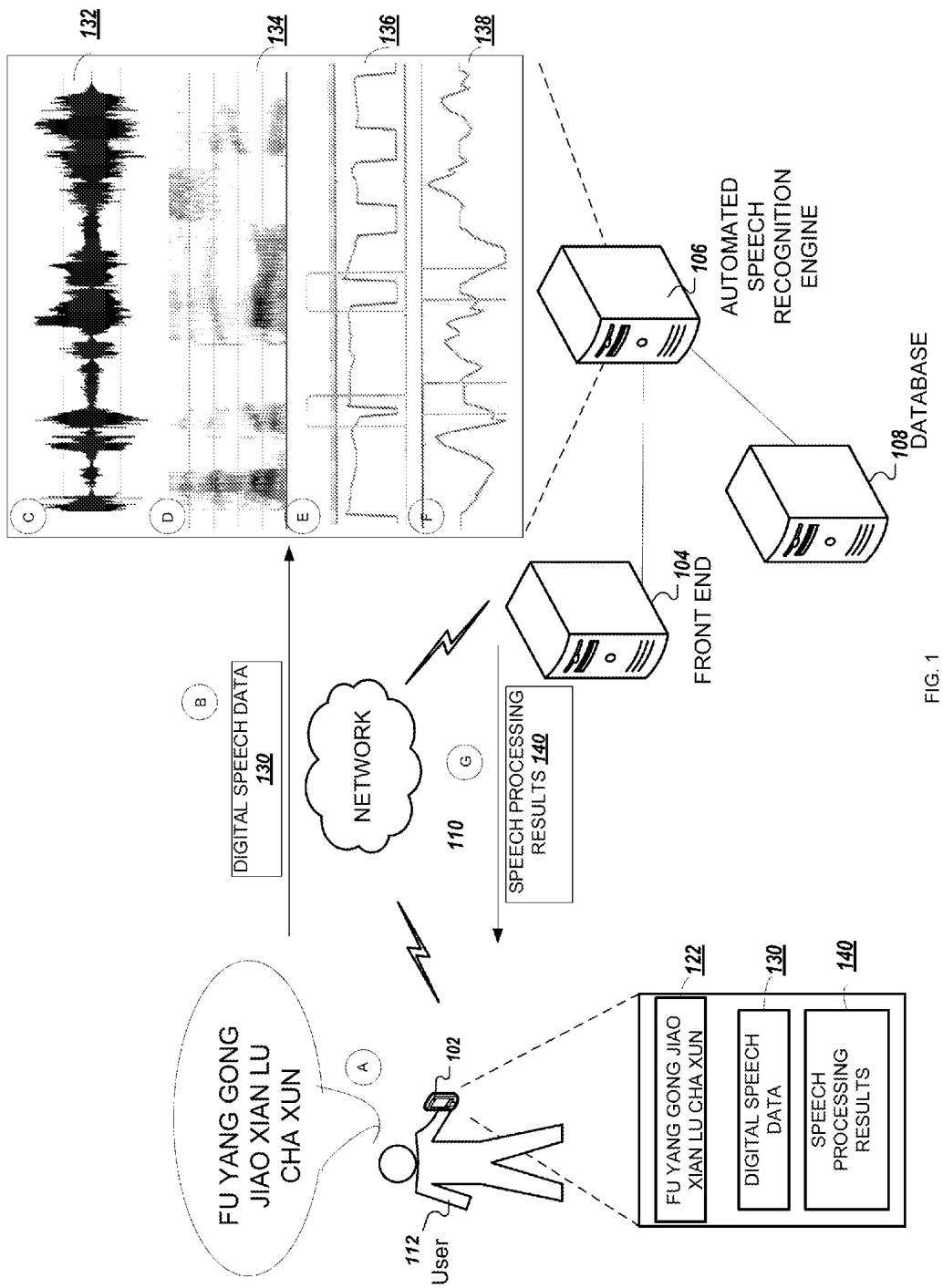
FIG. 1 is a diagram illustrating a server-side processing of digital speech data according to some example implementations.

FIG. 1 is a diagram illustrating server-side processing of digital speech data 130, according to some example implementations. User 112 may use a mobile computing device 102 to communicate with remote servers through network 110. As illustrated in time (A), user 112 speaks a sentence in Mandarin Chinese.

Mobile computing device 102 may be a hand-held computing device that includes, for example, a proximity-sensitive display screen, a keyboard, a processor, computer-readable memory, and a wireless network interface for communicating data through network 110. The wireless interface may include an antenna and accompanying radio-frequency (RF) electronics for transmitting signals to network 110, and for receiving signals from network 110. Examples of mobile device may include, but are not limited to mobile phones, PDAs, music players, e-book readers, tablet computers, or similar devices.

Mobile computing device 102 may be voiced activated. In particular, mobile computing device 102 may record the speech 122 of user 112 through, for example, an on-board microphone. Speech 122 may be recorded as digital speech data 130 and stored in the computer-readable memory of mobile computing device 102. The recording may entail the use of an analog to digital (A/D) converter.

At time (B), digital speech data 132 may be transmitted by mobile computing device 102 over the networks 110. Network 110 may include a digital cellular technology, such as, for example, Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN). Networks 110 may be based on a 3rd generation (3G) standard (for example, 3GPP, GSM 2G, TD-SCDMA, CDMA2000), a $4^{th}$ generation (4G) standard (for example, mobile WiMax, LTE), etc.

Digital speech data 130 may arrive at the server side for processing. Front end server 104 may receive the copy of digital speech data 130 from network 110 and then forward the copy to Automated Speech Recognition Engine 106 for further processing.

At time (C), ASR engine 106 may receive digital speech data 130. The received data 130 may be represented as temporal waveform 132. Temporal waveform 132 shows the amplitude of digital speech data 130 at each sampling time point. The amplitude indicates the strength of digital speech data 130 at each sampling time point.

At time (D), spectrogram 134 of temporal waveform 132 may be computed. Spectrogram 134 (or "spectrograph") shows the spectrum of temporal waveform 132 at the sampling time points. In other words, the spectrogram represents how the spectrum of temporal waveform 132 varies over the sampling time points.

At time (E), tonal feature 136 of temporal waveform 132 may be computed. Tonal feature 136 may include the detected tone of temporal waveform 132. Tonal feature 136 may include the fundamental frequency of temporal waveform 132. The fundamental frequency may characterize the vocal cavity of the speaker at the time of generating speech data. The fundamental frequency may be the spectral component with the highest intensity. The fundamental frequency also may be known as the pitch. The tonal feature also may include harmonics—spectral components located at multiples of the fundamental in the spectrum—or even subharmonics—spectral components located at fractions of the fundamental in the spectrum. The tonal feature varies over the sampling time points and the example computed tonal feature at time (E) shows the computed tonal feature at each sampling point.

At time (F), processed result 138 may be generated for tonal feature 136. Processed result 138 may be computed by a bifurcated processing that classifies temporal waveform 132 into voiced segments and unvoiced segments. A segment may refer to a subsection of temporal waveform 132. For example, if a segment of temporal waveform 132 is characterized as voiced, the voiced segment may be processed by taking a logarithm of the corresponding tonal feature 136 and then performing a first order derivative operation of the logarithm. If, however, a segment of temporal waveform 132 is characterized as unvoiced, the unvoiced segment may be replaced by, for example, a vector of pseudo-random noise. The vector may be of the same length as the unvoiced segment. The pseudo-random noise may be, for example, a zero-mean Gaussian white-noise. Processed result 138 may be a concatenation of all processed segments of temporal waveform 132.

The bifurcated processing, as described above, treats voiced segment and unvoiced segment differently. The discriminative treatment may generate processed result 138 that is more advantageous for subsequent voice recognition. For example, indiscriminative approaches may process each segment without regard to the nature of the underlying speech data. Such processing may generate abrupt changes such as overshoots in processed result 138. These abrupt changes in processed results tend to deteriorate the performance of subsequent processing for voice recognition. In comparison, the bifurcated processing may generate processed result 138 with reduced incidences of such abrupt changes. The reduction can lead to improved quality, such as increased accuracy, of subsequence processing for voice recognition or speaker identification.

ASR engine 106 may consult with database 108. Database 108 may include previously processed results for the same sentence or similar sentences, as spoken by the same person, or by other people. The same sentence may be spoken by people using the same dialect as the speaker of digital speech data 130. The same sentence may be spoken by people of the same gender or age group as the speaker of digital speech data 132.

ASR engine 106 may produce speech processing results 140 as the result of server-side processing. Processing results 140 may indicate the result of, for example, speaker identification, recognized speech content, etc. Processing results 140 may be return through network 110, as illustrated in time G, to mobile computing device 102. Mobile computing device 102 may display the recognized speech content to user 112. Mobile computing device 102 may also prompt user 112 to confirm the recognized speech content. If speech processing results 140 affirmatively identifies the speaker—user 112—as the authorized user of mobile computing device 102, mobile computing device 102 may grant user 112 access to subsequence use of mobile computing device 102.

Figure 2:
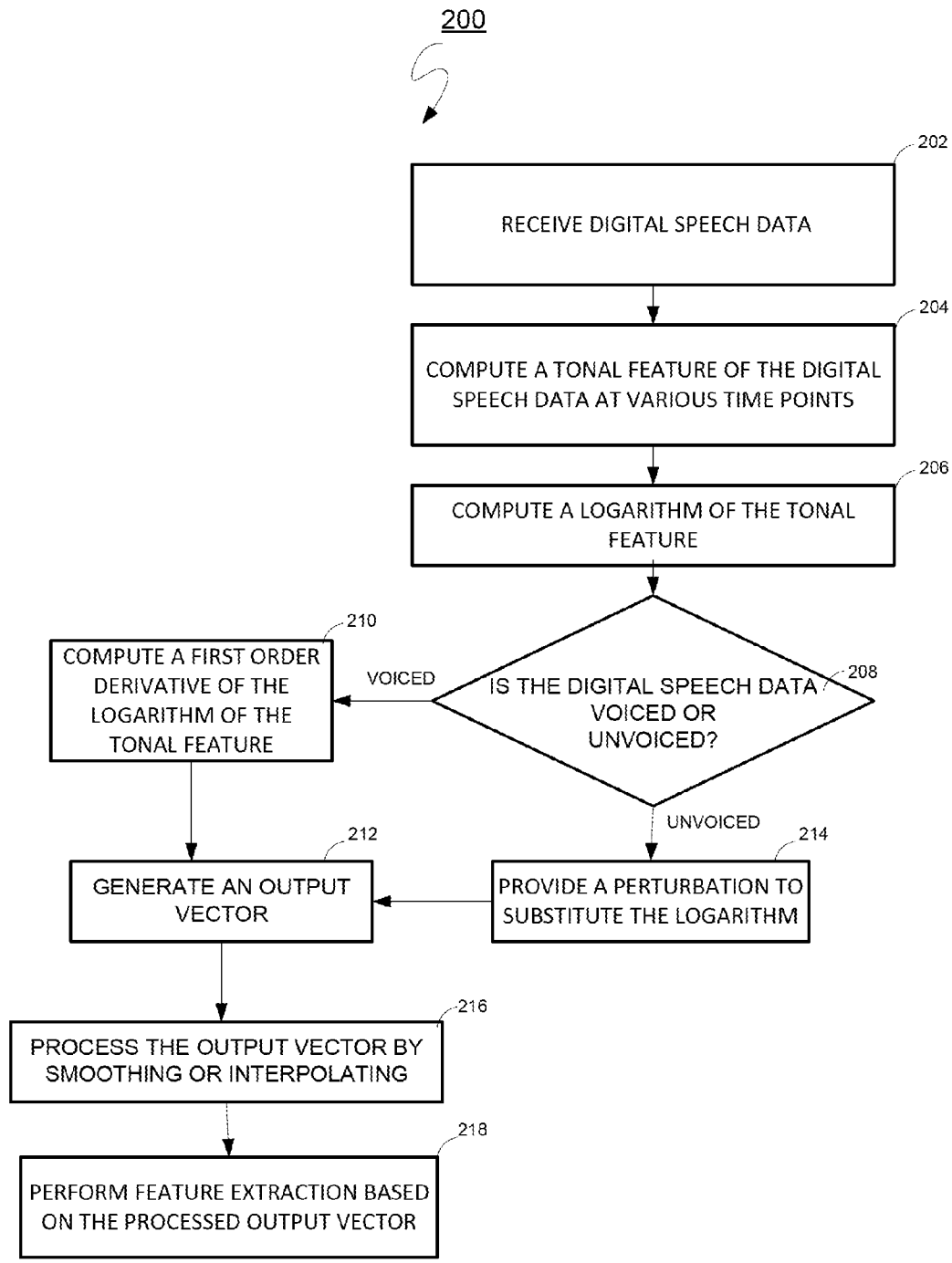
FIG. 2 is a flow chart illustrating a process for improving feature extraction according to an example implementation.

FIG. 2 is a flow chart illustrating a process 200 for improved feature extraction according to an implementation.

In block 202, digital speech data 130 is received at the server computer from the network 110. A copy of the digital speech data 130 may arrive in a compressed format using any of the known or yet to be developed compression techniques. The compression format may be converted by uncompressing, for example, at front end server 104 of FIG. 1. The compression may help preserving available bandwidth capacity of network 110. The compression may include a compression of sample rate and quantization bits. The compression may be lossy or lossless.

The original sampling rate of digital speech data 130 may occur at, for example, a sampling rate of 8-kHz. The 8-kHz sample rate has been widely used in telephone communication and may be adequate for human speech. Nonetheless, higher or lower sampling rate may be used, for example, 11.025 kHz (one quarter the sampling rate of audio CDs and employed for encoding various PCM, MPEG audio signals), 16 kHz (often used in many VoIP and VVoIP communication), 22.050 kHz (one half the sampling rate of audio CDs), 32 kHz, or as high as 5,644,800 Hz. Generally, higher sampling rate may lead to improved fidelity of the encoding quality at the cost of hardware and bandwidth expenses. Compression may reduce the effective sampling rate of the transmitted copy to a fraction, for example, less than 10%, of the original sampling rate, thus decreasing communication overhead across network 110 of FIG. 1.

The A/D conversion may quantify signal amplitude by using, for example, anywhere from 8 quantization bits to 16 quantization bits. The bits may quantify the amplitude of speech 130 at a given sampling point. Each bit may contribute a 6-dB dynamic range to the quantification result. Thus, a 12-bit quantization may result in a 72-dB dynamic range rail-to-rail for digital speech data 130. Compression may reduce the quantization bits allocated to a given sample of digital speech data 130 without the concomitant loss of dynamic range. Compression of the quantization level may be inherently coupled to the sampling rate. For example, the A/D conversion may use a form of delta-sigma modulation, in which the digital speech data may be quantified with fewer bits, for example 1-bit, yet at much higher frequency, for example 320 MHz, in a technique called over-sampling.

In block 204, the server, for example, ASR 106, may compute a tonal feature of the received copy of digital speech data 130. The tonal feature may be the fundamental frequency, a harmonic frequency, or a subharmonic frequency of digital speech data 130, as discussed above. Digital speech data 130 may include a sequence of samples at varying time points. The tonal feature may be computed for each of the sample time points of the received copy after uncompression.

In some implementations, the tonal feature may be computed by using a short-time Fourier transform of digital speech data 130. For each sample time point, the computation may isolate a subsequence of sample data points within a temporal range of the sample time point. The subsequence of data points may also be referred to as a segment of digital speech data. The segment of data points may be shaped by a window function, also known as an apodization function or a tapering function. The shaping may be implemented as a dot multiplication with the window function. Example windowing functions may include, but are not limited to, a rectangular window, hamming window, a hann window, a Tukey window, a cosine window, a Bartlett-hann window, a Blackman window, a Kaiser window, etc. The choice of a windowing function may be a trade-off between the resulting spectral resolution of the short-time Fourier transform and the dynamic range of the short-time Fourier transform. The spectra data resulting from the short time Fourier transform may be reveal a tonal feature, for example, the tone, the pitch, or fundamental frequency, the spectra data. In one example, the pitch may correspond to the spectra component with the highest intensity. In another example, the pitch may correspond to the lowest spectra component with intensities above a threshold value.

In other implementations, the tonal feature may be computed by using spectral filtering. For example, male speakers may have a fundamental frequency from about 85 to about 180 Hz. Therefore, spectral filters with a pass band that includes the male range may be sufficient to capture the fundamental frequency of a male speaker. Likewise, for female speakers whose fundamental frequency from about 165 to 255 Hz, spectral filters with a pass band that includes the female range may be sufficient to capture the fundamental frequency of these female speakers. Spectral filers may incorporate the windowing function, as discussed above, in the frequency domain.

In still other implementations, the tonal feature, such as the pitch or fundamental frequency, may be computed by using an autocorrelation of digital speech data 130 itself. An autocorrelation of digital speech data 130 may reveal a sequence of values with oscillating magnitudes. For example, the lag location of the second largest peak of the autocorrelation sequence may indicate the pitch or fundamental frequency. The autocorrelation sequence may be analyzed by other signal processing tools. For example, the autocorrelation sequence may be combined with zero-crossing rate analysis to ascertain the pitch or fundamental frequency.

In block 206, the server, for example ASR 106 of FIG. 1, may compute the logarithm of the tonal feature, for example, the pitch or fundamental frequency, from block 204. The logarithm may generate the Cepstrum of the digital speech data. The logarithm may be a 10-based logarithm. The logarithm also may be a natural logarithm based on e. The logarithm may even be a 2-based logarithm that can be implemented as a logic shift operation for fixed-point data. The logarithm computation generally may improve quality and consistency of speech signal processing. However, in some implementations, the logarithm computation may be skipped if the current segment is characterized as an unvoiced segment.

In block 208, the server, for example, ASR 106 of FIG. 1, may determine whether the segment of digital speech data corresponds to voiced data or unvoiced data. Sounds of a language may be organized into voiced and unvoiced sounds. With voiced sounds, the vocal chords are vibrated, which can be felt in the throat. With unvoiced sounds, the vocal chords are not vibrated, so there is no vibration in the throat. Generally, speech data corresponding to vowels and some consonants are voiced. Generally, speech data corresponding to other consonants are unvoiced. The non-stationary nature of speech can be modeled in terms of voiced and unvoiced data. Voiced data may be produced by the vibration of the vocal folds and the excitation may be either periodic or quasi-periodic. Unvoiced data may be produced by forcing air past some constriction in the vocal tract and the excitation may be aperiodic.

In one implementation, if ASR 106 can ascertain the pitch (or fundamental frequency) of a particular segment of digital speech data, then the particular segment of digital speech data may be determined as voiced. If, however, ASR 106 cannot ascertain the pitch (or fundamental frequency) of a particular segment of digital speech data, then the particular segment of digital speech data may be determined as unvoiced data.

If the server, for example, ASR 106, determines that the given segment of digital speech data corresponds to voiced data, the sever may proceed to compute the first order derivative of the logarithm of the tonal feature for the given segment, as illustrated in block 210. The first order derivative may be denoted as shown below, in Equation (1).

$$d(s)/d(t) \qquad (1)$$

In Equation (1), s denotes the input, such as the logarithm of the tonal feature for the given segment.

In some implementations, the first order derivative at each sample time point may be computed as the amplitude difference between two neighboring data samples. Because the sampling rate is fixed, the sampling time interval between the neighboring samples may a constant. Therefore the denominator in equation (1) may amount to a simple scaling factor, the omission of which may be permissible because the scaling factor affects the computed results equally and may impose no effect on subsequent computations.

In computing the first order derivative at a given sample time point, the two neighboring data samples may include one data sample at the given sample time point and another data sample at the sample time point immediately preceding the given sample time point. Immediately means there are no intervening sample data points. The two neighboring data samples also may include one data sample at the given sample time point and another data sample at the sample time point immediately following the given sample time point. The first order derivative computed per above may represent the first order derivative at a time instant half the sampling time interval away from the given sample time point. The sampling time interval may be determined by the sampling rate, as discussed above.

Some implementations may Interpolate the data samples to provide (a) one interpolated data sample located half the sampling time interval before the given sample time point; and (b) one interpolated data sample located half the sampling time interval after the given sample time point. The first order derivative computed based on these two interpolated data samples may represent the first order derivative at the given sample time point.

Returning to block 210, if, however, the server computer, for example, ASR 106, determines that the given segment of digital speech data 132 corresponds to unvoiced data, then the server computer may proceed to provide a perturbation to substitute the given segment of digital speech data 130. The perturbation may include a vector of the size of the given segment. The vector may include a sequence of samples from a pseudo-random noise (PRN) generator. The pseudo-random noise generator may be a sequence generator. To improve the apparent randomness, the pseudo-random noise (PRN) generator may incorporate a seed value based on a physical parameter on the server computer that varies, such as the temperature of a processor, the rotating speed of a cooling fan, etc. The pseudo-random noise generated may be characterized by, for example, a Gaussian white noise, with a zero mean and a characteristic standard deviation. Empirical experience suggests that a zero-mean Gaussian random noise with a characteristic standard deviation of around 0.1 may be an adequate substitute. The injected pseudo-random noise may cap the magnitude of oscillations within the segments of digital speech data correspond to unvoiced data. This injection of pseudo-random noise thus may provide numerical stabilities to mitigate overflow or underflow conditions.

In block 212, the server computer may generate an output based on a combination of the first order derivative from block 210 and the substitute perturbation from block 214. In particular, the server computer may generate the output vector by stitching the first order derivative and the substitute perturbation according to the order in which the corresponding segments are presented in the digital speech data 132 received in block 202.

In block 216, the output vector may be further processed, for example, by smoothing or interpolation. Smoothing may include rectangular or unweighted sliding-average smoothing in which each sample point in the signal is replaced with a simple average of m adjacent points, with m being a positive integer known as the smooth width. The smoothing may incorporate more sophisticated windowing functions, the examples of which have been discussed above in association with block 204.

Interpolation may include a nearest neighbor interpolation, a bilinear interpolation, a cubic interpolation, a spline interpolation, a Lagrange interpolation, a Hermite interpolation etc. The interpolation may map the output vector to a different temporal index. The different temporal index may be offset from the original temporal index on which digital speech data 132 is based. The different temporal index may be more dense or more sparse than the original temporal index.

Figure 3:
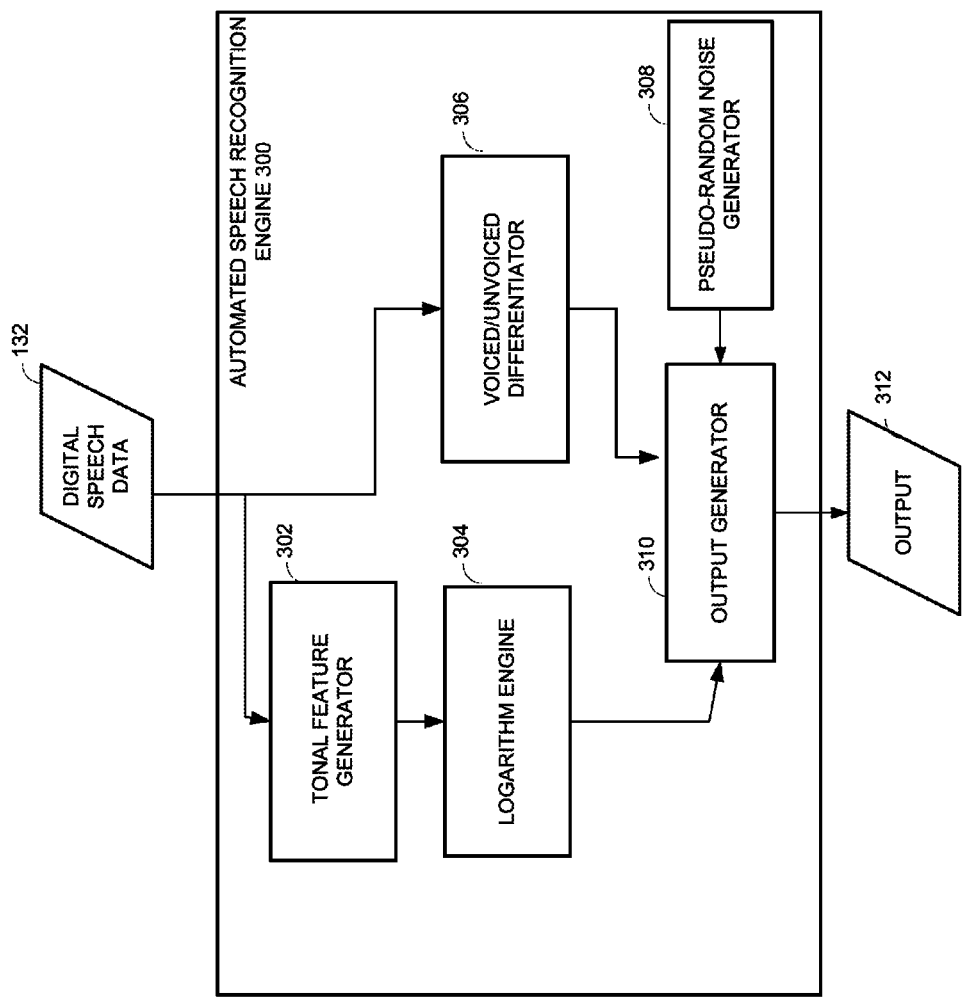
FIG. 3 is a diagram showing an automated speech recognition system according to an example implementation.

FIG. 3 is a diagram showing an automated speech recognition (ASR) engine 300. ASR 300 may include a tonal feature generator 302, a logarithm engine 304, voiced/unvoiced differentiator 306, pseudo-random noise generator 308, and output generator 310.

ASR Engine 300 may divide digital speech data 132 into segments, each containing, for example, 10 ms of speech or 80 consecutive sample data points (at a sampling rate of 8 kHz). The temporal length of each segment may be chosen such that digital speech data 132 can be treated as statistically stationary for the duration. Statistically stationary means that a model may be adequate enough to characterize digital speech data 132 for the duration of the segment. Neighboring segments may have overlapping sample data points to improve continuity of subsequent processing.

For each segment, tonal feature generator 302 may compute the tonal feature. The tonal feature may be a tone, a pitch, a fundamental frequency, a harmonic frequency, a subharmonic frequency, as discussed above. The tonal feature may be represented by a vector of the same length of the segment.

Logarithm engine 304 may then compute the logarithm of the tonal feature. As discussed above in association with bock 206, the logarithm may be 10-based or a natural logarithm.

Characterizer 306 may ascertain whether the current segment is voiced or unvoiced data. As discussed above in association with block 208, voiced sound may be modeled as vibrations of the vocal folds caused by periodic or aperiodic excitations whereas unvoiced sounds (noise-like) may be aperiodic and produced by forcing air past some constriction in the vocal tract. Vowels are generally voiced sound while consonants may be unvoiced sound.

Pseudo-random noise (PRN) generator 308 may output noise samples. For example, PRN generator may generate a sequence of noise samples of the same length of the current segment of digital speech data 132. The noise samples may be characterized by, for example, a white Gaussian noise. The Gaussian noise may be zero-mean in which case the noise follows a standard normal distribution. Empirically, a standard deviation of about 0.1 may be adequate. Simulated noise of other characteristics, such as pink noise with low frequency components being more predominant, may be used as well.

Output generator 310 is coupled to logarithm engine 304, Characterizer 306, and pseudo-random generator 308. For a current segment of speech data, output generator 310 may use the logarithm result from logarithm engine 304, if characterizer 306 determines the current segment as voiced data. If, however, characterizer 306 determines the current segment as unvoiced data, output generator 310 may use the noise samples from pseudo-random noise generator 308. Output generator may process other segments of digital speech data 132 in like manner. Thus, output generator 310 may combine the logarithm result from logarithm engine 304 and the noise samples from pseudo-random noise generator 308 to generate output 312, which may correspond to the processed output vector of block 218 in FIG. 2. In stitching together the processed segments to generate output 312, output generator 310 may smooth or interpolate the processed segment as discussed above in association with block 216. If the neighboring segments have overlapping sample data points, the output generator may use, for example, the average of results for the two neighboring segments.

Figure 4:
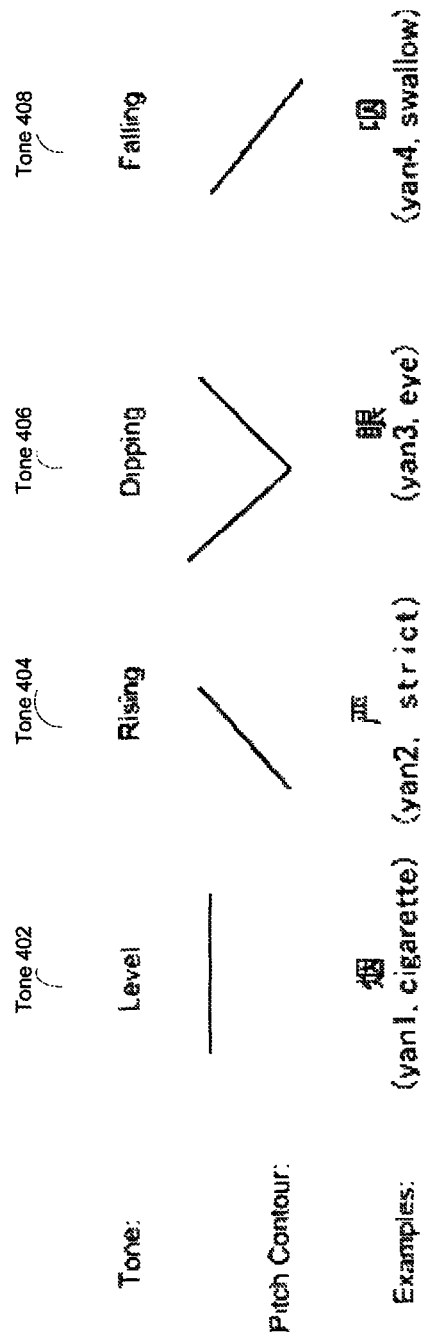
FIG. 4 illustrates the four tonal features of a sample mandarin Chinese speech.

FIG. 4 illustrates the four tonal variations of Mandarin Chinese speech. Mandarin is the official spoken Chinese language, also known as PuTongHua. The tonal variations discussed herein generally apply to other dialects of Chinese language, such as, for example, Cantonese. In fact, the tonal variations discussed herein may also apply to other spoken languages in east Asia, such as Korean, Japanese, Vietnamese, etc.

FIG. 4 shows the phonetic sound for four different Chinese characters. To resolve the ambiguity in which the same pronunciation denotes four words of different meanings, the Chinese language resorts to tonal variations.

The first tonal variation is the level tone (or flat tone) in which the tone remains flat, as illustrated by tone 402, the Chinese character the pronunciation of which is being illustrated as the level tone means cigarette.

The second tonal variation is the rising tone, as illustrated by tone 404. The Chinese character in this example means strict.

The third tonal variation is the dipping tone, in which the tone dips and then rises. The example Chinese character being illustrated by tone 406 means eye.

The fourth tonal variation is the falling tone, as illustrated by tone 408. The Chinese character being illustrated in this example means swallow.

As illustrated, tonal variation in Chinese language resolve linguistic ambiguities. Therefore, improving the detection of tonal variations may enhance subsequent speech recognition or speaker identification.

Figure 5A:
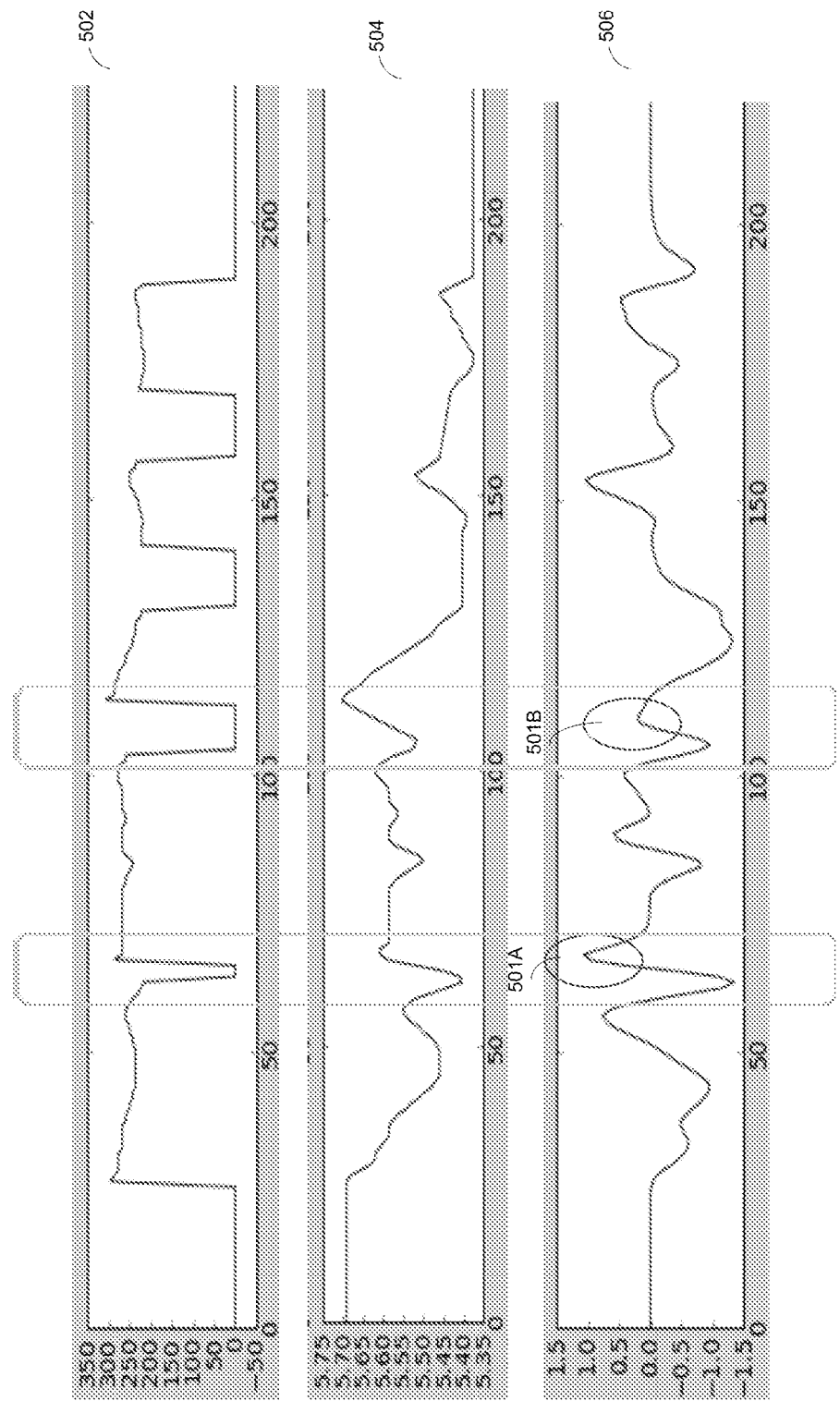
FIG. 5A illustrates a sample speech data being processed without voiced/unvoiced differentiation.

FIG. 5A illustrates a sample digital speech data being processed with no differentiation between voiced and unvoiced segments. The specific Chinese characters corresponding to the sample digital speech data are displayed on top of the three panels. The first panel shows the computed tonal feature 502. It represents the computed tone of the sample digital speech data. The tone is computed for each sample time point. Example methodologies of computing the tone have been discussed in association with block 206 of FIG. 2.

The second panel shows the computed logarithm 504 of the sample digital speech data. The logarithm was computed per a natural logarithm of computed tonal feature 502.

The third panel shows the computed first order derivative 506 for computed logarithm 504. First order derivative 506 is normalized and range bound between −1 and 1. The first order derivative was computed in accordance with the methodologies discussed above in association with block 206 of FIG. 2.

As the first order derivative was computed regardless of the characterization of the underlying speech data, undesirable results may be generated. For example, at the two regions highlighted by the two vertical boxes, the computed first order derivative exhibits overshoots, as illustrated by circles 501A and 501B. The overshoots may represent a distortion and may cause certain features that are present to be undetected in subsequent detection or recognition. The distortion also may cause features that are not present in the sample digital speech to be detected or recognized as if they were present.

Figure 5B:
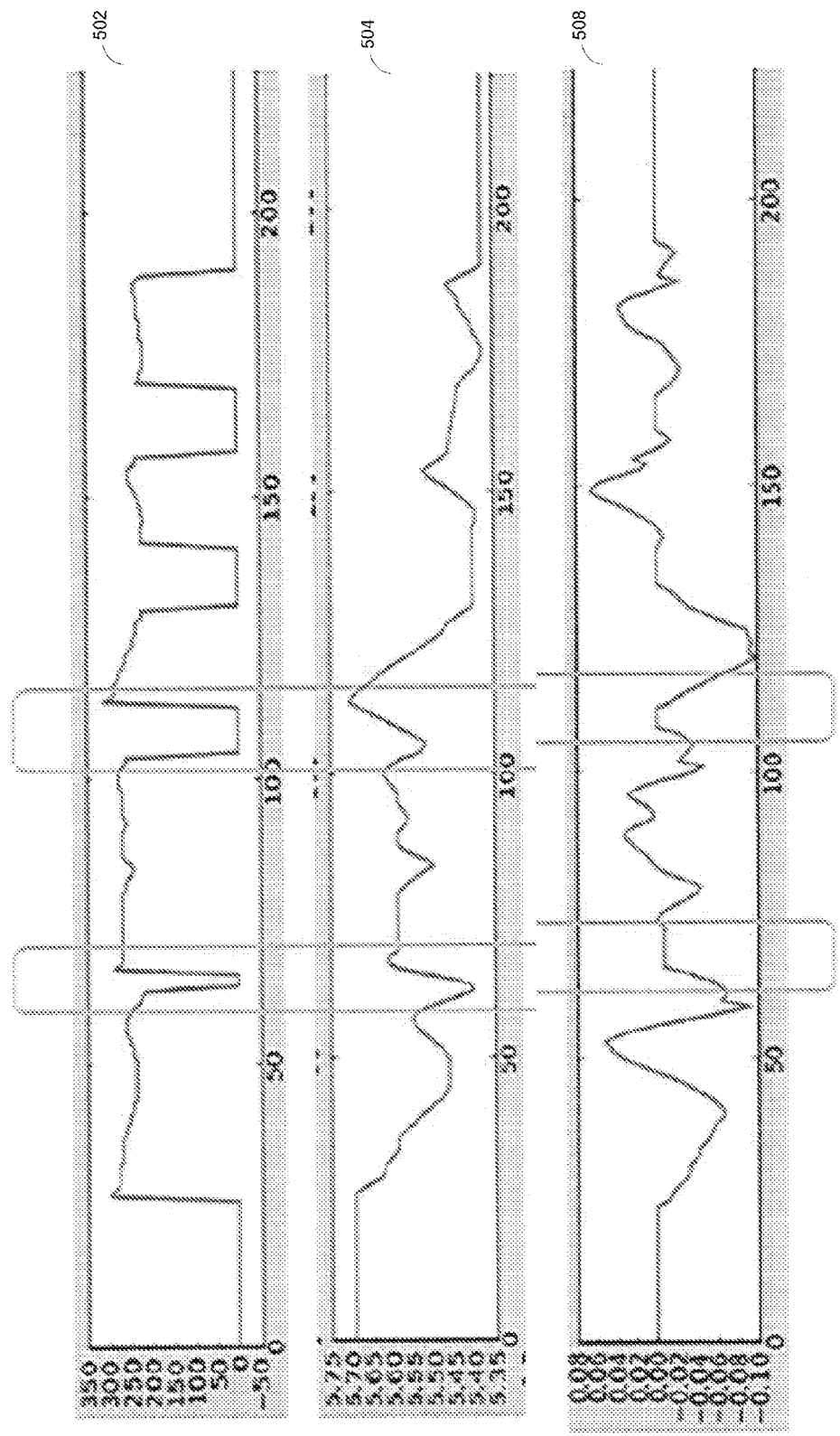
FIG. 5B illustrates the sample speech data being processed according to an example implementation.

FIG. 5B illustrates the sample digital speech data being processed according to an implementation. The specific Chinese characters corresponding to the sample digital speech data are the same as in FIG. 5A and displayed on top of the three panels. The first panel shows the computed tonal feature 502. It represents the computed tone of the sample digital speech data. The tone was computed for each sample point. Example methodologies of computing the tone have been discussed in association with block 206 of FIG. 2.

The second panel shows computed logarithm 504 of computed tonal feature 502. The logarithm was computed per a 10-based logarithm a natural logarithm.

The third panel shows the processed result 508 according to an implementation. Each segment of the computed tonal feature 502 was processed according to the characterization of the segment. If the segment was characterized as voiced, then the first order derivative of the corresponding logarithm of the tonal feature for this segment was computed. If, however, the segment was characterized as unvoiced, then the segment was replaced with a vector of pseudo-random noise. The vector was of the same length as the segment. The pseudo-random noise was a zero-mean Gaussian (also known as normal distribution) noise. The processed segments were stitched together in the original order as in the sample digital speech data. Process result 508 shows a subsection of the processed segments of one sample speech. At the same regions highlighted by two vertical boxes, the overshoot illustrated by circles 501A and 501B of FIG. 5A are no longer present in FIG. 5B, thus demonstrating the efficacy of the proposed bifurcation in processing. The improvement in reduced occurrences of overshoot or dampened amplitudes in overshoots can lead to improved detection, extraction, and recognition efficacy in downstream speech processing such as, for example, speaker recognition, voice recognition, etc.

A baseline method without any tone processing was applied in conjunction with a proprietary voice search system. Then, a tone processing method without the proposed bifurcation processing and a tone process method including the proposed bifurcation processing were both applied in conjunction with a proprietary voice search system. Thereafter, the performances of the three methods were compared in their respective character error rate (CER). The CER provides an objective index of the quality of voice recognition by quantifying the percentage of characters erroneously recognized. As summarized by Table 1 below, the baseline method achieves a CER of 51.8%. The "traditional" method, as applied with the voice search system, achieves a character error rate (CER) of 50.4%. The proposed method, as applied with the voice search system, achieves a CER of 48.2%. Thus, the potential improvement in recognition quality associated with the proposed bifurcation processing has been demonstrated.

TABLE 1

| Models | CER | Gains (from baseline) |
|---|---|---|
| Baseline | 51.8% | |
| Traditional | 50.4% | 1.4% |
| Proposed | 48.2% | 3.6% |

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by one or more servers, digital speech data from a computing device;
determining, by the one or more servers, a respective pitch of the digital speech data for each of multiple time segments;
determining, by the one or more servers and for each of the multiple time segments, a logarithm of the pitch of the digital speech data for the time segment;
after determining the respective logarithm of the pitch of the digital speech data for each of the multiple time segments, determining whether each time segment is classified as a voiced time segment or as an unvoiced time segment;
for each time segment that is classified as a voiced time segment, determining a first order derivative of the logarithm of the pitch for the time segment;
for each segment that is classified as an unvoiced time segment, obtaining zero-mean random noise; and
combining (i) the first order derivative of the logarithm of the pitch, for each time segment that is classified as a voiced time segment, with (ii) the zero-mean random noise, for each time segment that is classified as an unvoiced time segment.

2. The method of claim 1, further comprising:
processing the combination of the first order derivative of the logarithm of the pitch and the zero-mean random noise by one of: a smoothing operation, or an interpolation operation.

3. The method of claim 2, wherein the interpolation operation is one of: a bilinear interpolation, a cubic interpolation, or a spline interpolation.

4. The method of claim 1, further comprising:
incorporating the respective pitch of the digital speech data for one or more of the multiple time segments into a database.

5. The method of claim 1, wherein the zero-mean random noise is characterized by a Gaussian random noise with a characteristic standard deviation on the order of about 0.1.

6. The method of claim 1, wherein the unvoiced time segments of the digital speech data correspond to segments of the digital speech data where the pitch is computed to be substantially zero,
wherein the unvoiced time segments of the digital speech data represent some consonants in the digital speech data, and wherein the voiced time segments of the digital speech data represent vowels or other consonants in the digital speech data.

7. A non-transitory computer-readable medium storing software comprising instructions executable by one or more computers which, upon such execution, cause the one or more computers to perform operations comprising:
receiving, by one or more servers, digital speech data from a computing device;
determining, by the one or more servers, a respective pitch of the digital speech data for each of multiple time segments;
determining, by the one or more servers and for each of the multiple time segments, a logarithm of the pitch of the digital speech data for the time segment;
after determining the respective logarithm of the pitch of the digital speech data for each of the multiple time segments, determining whether each time segment is classified as a voiced time segment or as an unvoiced time segment;
for each time segment that is classified as a voiced time segment, determining a first order derivative of the logarithm of the pitch for the time segment;
for each segment that is classified as an unvoiced time segment, obtaining zero-mean random noise; and
combining (i) the first order derivative of the logarithm of the pitch, for each time segment that is classified as a voiced time segment, with (ii) the zero-mean random noise, for each time segment that is classified as an unvoiced time segment.

8. The computer-readable medium of claim 7, wherein the operations further comprise:
processing the combination of the first order derivative of the logarithm of the pitch and the zero-mean random noise by one of: a smoothing operation, or an interpolation operation.

9. The computer-readable medium of claim 8, wherein the interpolation operation is one of: a bilinear interpolation, a cubic interpolation, or a spline interpolation.

10. The computer-readable medium of claim 7, wherein the operations further comprise:
incorporating the respective pitch of the digital speech data for one or more of the multiple time segments into a database.

11. The computer-readable medium of claim 7, wherein the zero-mean random noise is characterized by a Gaussian random noise with a characteristic standard deviation on the order of about 0.1.

12. The computer-readable medium of claim 7, wherein the unvoiced time segments of the digital speech data correspond to segments of the digital speech data where the pitch is computed to be substantially zero,
wherein said unvoiced time segments of the digital speech data represents some consonants in the digital speech data, and wherein said voiced time segments of the digital speech data represent vowels or other consonants in the digital speech data.

13. A system comprising:
one or more computers and one or more storage devices storing instructions that are operable, when executed by the one or more computers, to cause the one or more computers to perform operations comprising:
receiving, by one or more servers, digital speech data from a computing device;
determining, by the one or more servers, a respective pitch of the digital speech data for each of multiple time segments;
determining, by the one or more servers and for each of the multiple time segments, a logarithm of the pitch of the digital speech data for the time segment;
after determining the respective logarithm of the pitch of the digital speech data for each of the multiple time segments, determining whether each time segment is classified as a voiced time segment or as an unvoiced time segment;
for each time segment that is classified as a voiced time segment, determining a first order derivative of the logarithm of the pitch for the time segment;
for each segment that is classified as an unvoiced time segment, obtaining zero-mean random noise; and
combining (i) the first order derivative of the logarithm of the pitch, for each time segment that is classified as a voiced time segment, with (ii) the zero-mean random noise, for each time segment that is classified as an unvoiced time segment.

14. The system of claim 13, wherein the operations further comprise:

processing the combination of the first order derivative of the logarithm of the pitch and the zero-mean random noise by one of: a smoothing operation, or an interpolation operation.

15. The system of claim 14, wherein the interpolation operation is one of a bilinear interpolation, a cubic interpolation, or a spline interpolation.

16. The system of claim 13, wherein the operations further comprise:
incorporating the respective pitch of the digital speech data for one or more of the multiple time segments into a database.

17. The system of claim 13, wherein the zero-mean random noise is characterized by a Gaussian random noise with a characteristic standard deviation on the order of about 0.1.

18. The system of claim 13, wherein the unvoiced time segments of the digital speech data correspond to segments of the digital speech data where the pitch is computed to be substantially zero,
wherein said unvoiced time segments of the digital speech data represent some consonants in the digital speech data, and wherein said voiced time segments of the digital speech data represent vowels or other consonants in the digital speech data.

19. The method of claim 1, wherein determining the pitch of the digital speech data for each of the multiple time segments comprises:
determining the pitch of the digital speech data for each of the multiple time segments by using one of: a short-time Fourier transform, spectral filtering, or autocorrelation of the digital speech data.

20. The computer-readable medium of claim 7, wherein determining the pitch of the digital speech data for each of the multiple time segments comprises:
determining the pitch of the digital speech data for each of the multiple time segments by using one of: a short-time Fourier transform, spectral filtering, or autocorrelation of the digital speech data.

21. The system of claim 13, wherein determining the pitch of the digital speech data for each of the multiple time segments comprises:
determining the pitch of the digital speech data for each of the multiple time segments by using one of: a short-time Fourier transform, spectral filtering, or autocorrelation of the digital speech data.

* * * * *

UNITED STATES PATENT AND TRADEMARK OFFICE
CERTIFICATE OF CORRECTION

| | | |
|---|---|---|
| PATENT NO. | : 8,725,498 B1 | Page 1 of 1 |
| APPLICATION NO. | : 13/556856 | |
| DATED | : May 13, 2014 | |
| INVENTOR(S) | : Sung et al. | |

It is certified that error appears in the above-identified patent and that said Letters Patent is hereby corrected as shown below:

In the Claims:

In Column 17, Line 6, Claim 15, delete "of" and insert -- of: --, therefor.

Signed and Sealed this
Seventh Day of October, 2014

Michelle K. Lee
*Deputy Director of the United States Patent and Trademark Office*